R. R. KIMBALL.
BEDSTEAD.
APPLICATION FILED MAR. 19, 1913.
1,070,814.
Patented Aug. 19, 1913.
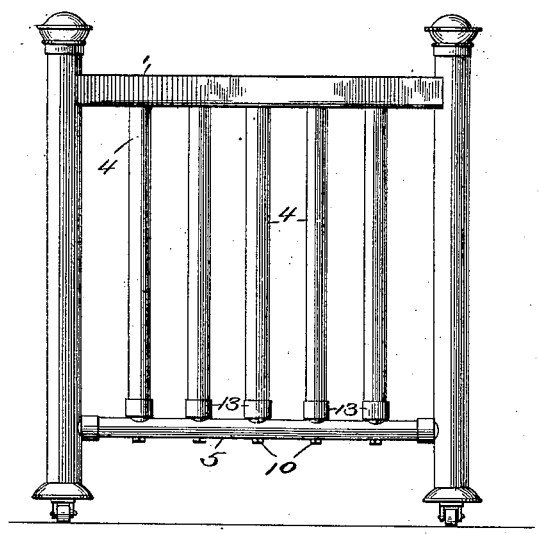
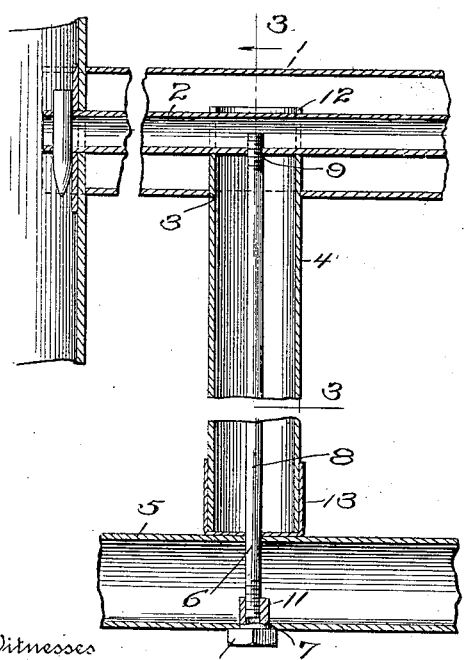
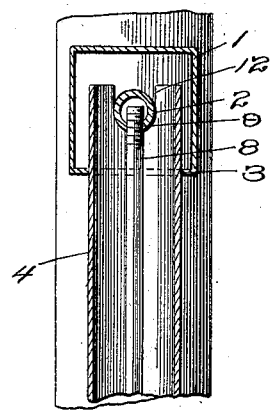

UNITED STATES PATENT OFFICE.

RALPH R. KIMBALL, OF CHICAGO, ILLINOIS.

BEDSTEAD.

1,070,814.    Specification of Letters Patent.    Patented Aug. 19, 1913.

Application filed March 19, 1913. Serial No. 755,444.

*To all whom it may concern:*

Be it known that I, RALPH R. KIMBALL, a citizen of the United States, residing at Chicago, in the county of Cook and State of Illinois, have invented certain new and useful Improvements in Bedsteads; and I do hereby declare the following to be a full, clear, and exact description of the invention, such as will enable others skilled in the art to which it appertains to make and use the same.

This invention relates to improvements in the construction of bedsteads, and more particularly to means for preventing turning of filler bars or ladder rods in the end posts of a metal bed.

A further object of the invention is to provide means for locking parallel tubes forming part of the framework of the ends of a bed rigidly together, these means also being such as to take care of variations in the sizes of the materials used.

With these and other objects in view, the invention consists in certain novel constructions, combinations and arrangements of the parts as hereinafter shown and described, and then specifically pointed out in the claims.

In the drawings, Figure 1 is an end view of part of a bed constructed in accordance with the present invention; Fig. 2 is a section taken at right angles to Fig. 1 through one of the spindles, and, Fig. 3 is a section taken on line 3—3 of Fig. 2.

In the drawings, like reference characters designate corresponding parts.

In the construction of metal bedsteads, it is desirable to have the joints between the cross bars and filler bars formed neatly, and at the same time have the filler bars and cross bars rigidly connected to each other, so as to prevent turning of either with respect to the other. In order to accomplish this result, the present invention aims to form the filler bars with slots or other cutaway portions which are designed to engage rigid rods contained within the cross bars or tubes, together with means for holding the filler bars rigidly to these rods.

Referring to the drawings, where one embodiment of the invention is shown, 1 represents the top cross bar of the end of a bed constructed in accordance with the present invention, this bar being shown as hollow channel brass. Passing through the channel member 1, is a rod 2, which may be used as a positioning rod for spacing the filler bars, this rod being tubular if desired, as hereinafter described, the ends of the rod 2 being secured in any desirable manner to the ends of the channel member 1. Any one of a number of satisfactory means may be used for rigidly supporting the rod 2, within the channel member 1, so no particular description will be given concerning this feature. The lower surface of the channel member 1 is provided with spaced openings 3 through which pass filler bars 4, which filler bars may be hollow and of any geometrical form, preferably cylindrical.

Extending beneath the channel member 1, and parallel therewith, and abutting the lower ends of the spindles 4, is a tubular member 5, being provided with spaced openings 6 and 7. Passing through each of the openings 6 of the tubular member 5, is a rod 8 each end of which is threaded, one end of the rod being adapted to pass through a threaded opening 9 formed in the rigid rod 2, while the other end of the threaded rod 8 engages a nut 10 having a hollow shank 11 extending therefrom, which is internally threaded and engages the threads of the rod 8. The nut 10 is adapted to engage the lower portion of the tubular member 5 so that as the nut is turned, the tubular member 5, the spindles 4, and the channel member 1 will all be locked securely together.

The upper ends of the spindles 4 are each provided with slots 12, these slots 12 being two in number and at diametrically opposite points of the filler bar 4. The rods 2 are designed to fit snugly within the slots 12, and insomuch as said rod 2 is rigid with the channel member 1, it will be readily seen that it will be impossible for the filler bars 4 to turn when the various members are locked together by means of the rod 8 and nut 10.

Suitable end collars 13 may be provided at the upper end of the spindles 4 and at such other parts of the construction, as may be desired, for the purpose of improving the appearance of the bedstead, but these end collars form no part of the invention.

While the drawings show that the means for preventing the turning of the filler bars 4, is located within the channel member 1, yet it is to be understood that the means could also be contained within the tubular member 5.

It will be noted that if in the assembly of the various parts of the bed according to the invention, that should the rods 8 be of varying length, that this irregularity will be taken care of by reason of the fact that both ends of the rods are threaded, and that if the nut 10 rocks upon the lower end of the rod 8 before the various parts are bound together, a further rotation of the rod 10 will turn the upper threaded end of the bar 8 through the threaded opening 9 so as to insure the positive binding together of the various members.

From the structure herein disclosed, it will be seen that the joints where the spindles pass through the parallel cross bars, are neat, and that at the same time the spindles are locked to the cross bars in such a way as to prevent their rotation.

Having thus described the invention, what is claimed as new is:

1. In a bed construction, a tubular member, a rod rigidly mounted within the tubular member, a bar substantially parallel to the tubular member and spaced therefrom, filler bars located between the tubular member and bar, one end of each of the filler bars passing into the tubular member and engaging the said rigid rod, a bolt threaded on both ends located within each of the filler bars, one end engaging the rigid rod while the other end is engaged by first mentioned bar.

2. In a bed construction, a frame member, a rigid rod parallel to said frame member, filler bars interposed between said frame member and said rod, a positioning member carried by one end of each of the filler bars provided with an opening, slots formed in the other end of each of the filler bars, said slots adapted to engage the rigid rod, a bolt threaded on each end, one end of said bolt adapted to engage the rigid rod while the other end passes through the opening in the positioning member, and means engaging the last mentioned end of the bolt adapted to bind the rigid rod, frame member, and filler bars together.

3. In a bed construction, a tubular member, a rod rigidly mounted within said tubular member, a frame member parallel to said tubular member and spaced therefrom, filler bars located between the tubular and frame members, one end of each of the filler bars being provided with a slot adapted to engage the rigid rod, a positioning member provided with an opening carried by the other end of each of the filler bars, and a bolt located within each of the filler bars threaded on both ends and adapted to pass through one of the positioning members and engage the rigid rod and frame member.

In testimony whereof I affix my signature in presence of two witnesses.

RALPH R. KIMBALL.

Witnesses:
WILLIAM L. BURT,
HENRY E. COLTON.